United States Patent [19]

Akkerman et al.

[11] Patent Number: 4,691,893
[45] Date of Patent: Sep. 8, 1987

[54] FAIL SAFE GATE VALVES AND ACTUATORS THEREFOR

[75] Inventors: Neil H. Akkerman; Gonzalo Vazquez, both of Houston, Tex.

[73] Assignee: AVA International Corporation, Houston, Tex.

[21] Appl. No.: 9,655

[22] Filed: Jan. 28, 1987

Related U.S. Application Data

[63] Continuation of Ser. No. 884,869, Jul. 10, 1986, abandoned, which is a continuation of Ser. No. 689,969, Jan. 9, 1985, abandoned, which is a continuation of Ser. No. 342,585, Jan. 25, 1982, abandoned.

[51] Int. Cl.[4] .................. F16K 31/14; F16K 31/60
[52] U.S. Cl. ....................................... 251/14; 74/625; 137/79; 137/456; 137/553
[58] Field of Search ............... 251/14, 89; 74/625; 60/400, 401; 137/79, 80, 456, 457, 553

[56] References Cited

U.S. PATENT DOCUMENTS

| | | | |
|---|---|---|---|
| 2,644,485 | 7/1953 | Schwendner | 251/66 X |
| 2,859,639 | 11/1958 | Bryant | 74/625 |
| 2,885,172 | 5/1959 | Natho | 251/14 |
| 2,890,014 | 6/1959 | Luoma et al. | 251/14 |
| 3,556,463 | 1/1971 | Williams | 251/14 |
| 3,622,119 | 11/1971 | Weber | 251/96 |
| 3,640,140 | 2/1972 | Gulick . | |
| 3,789,875 | 2/1974 | McGee | 137/553 |
| 3,842,690 | 10/1974 | Gulick | 251/14 X |
| 3,842,852 | 10/1974 | Wicke | 137/77 |
| 3,842,854 | 10/1974 | Wicke | 137/77 |
| 3,889,922 | 6/1975 | Peters | 251/14 |
| 4,194,718 | 3/1980 | Baker et al. | 251/14 |
| 4,240,455 | 12/1980 | McGee | 137/77 |
| 4,285,493 | 8/1981 | Willie | 251/14 |

Primary Examiner—William E. Tapolcai
Attorney, Agent, or Firm—Vaden, Eickenroht, Thompson & Boulware

[57] ABSTRACT

There are disclosed several embodiments of a fail safe gate valve and actuator having means for yieldably urging the gate from one position to which it is moved under one or more controlled conditions to its other position upon failure of one such condition, means including a handwheel mounted on the actuator for moving the gate to its one position, and means automatically responsive to a control signal for rendering the handwheel inoperative to move the gate to its one position upon reestablishment of said one controlled condition. In certain embodiments, the control signal is automatically responsive to the reestablishment of said one controlled condition; and, in another embodiment, it is automatically responsive to the failure of said one controlled condition. The controlled conditions are disclosed as being one or both of a predetermined fluid pressure condition, and or a predetermined environmental temperature condition.

80 Claims, 13 Drawing Figures

Fig. 13

FAIL SAFE GATE VALVES AND ACTUATORS THEREFOR

This application is a continuation of application Ser. No. 884,869, filed July 10, 1986, now abandoned, which is a continuation of prior application Ser. No. 689,969, filed Jan. 9, 1985, now abandoned, which is a continuation of prior application Ser. No. 342,585, filed Jan. 25, 1982, now abandoned.

This invention relates generally to fail safe gate valves and actuators therefor wherein the gate is moved to and maintained in one position under one or more controlled conditions, such as a predetermined fluid pressure level, and yieldably urged to its other position, upon failure of one such condition. More particularly, it relates to improvements in fail safe gate valves and actuators of the type in which the gate may be moved to its one position by means of a handwheel.

In one type of fail safe valve for which the present invention has particular utility, the gate is normally held in its one position by control fluid acting over piston means arranged within the actuator to move a stem connected to the gate in the desired direction. The source of control fluid, whether pneumatic or hydraulic, may be fluid in the line being controlled by the valve, a fluid which is caused to be supplied to the actuator in response to a predetermined condition of the line fluid, or alternatively, a fluid which is independent of line fluid. In any event, the valve "fails" when the pressure of the control fluid drops below the predetermined level due to an abnormality, which may be, for example, a leak in the line.

In actuators for gate valves of this latter type, the stem is of the rising type to which a handwheel may be connected for manually moving the gate to either of its positions. For example, in a gate valve designed to fail closed in the event line pressure drops below a certain level, the handwheel may be necessary in order to return the valve to open position and thus restore the system to a condition in which the actuator will be responsive to control pressure. Also, the handwheel connection enables the valve to be manually closed or opened in the event the control pressure responsive mechanism becomes inoperative.

If the handwheel is mounted on the valve stem, as in the case of one such valve, so that the control pressure responsive mechanism may be overriden at will, the valve does not qualify as fail safe or fail closed by standards recognized by the A.P.I. Thus, in order for valves of this type to so qualify, it has been the practice to merely provide a means on the stem to which a handwheel may be connected, if and when needed. Such an arrangement is of course subject to considerable human error, such as absence or misplacement of the handwheel, the time and care required to connect the handwheel, etc. In addition, it requires that an extension of the stem to which the handwheel may be connected be "stacked" above the bonnet, thereby increasing the space requirements thereabove by a distance at least equal to the stroke of the gate in moving between its alternate positions.

It is therefore a primary object of this invention to provide a valve and actuator of the type described wherein the handwheel is mounted on the actuator bonnet, but which nevertheless qualifies as a fail safe valve in that the handwheel may not override the safety system to move the gate back to its other position following failure and return of the system to controlled condition.

A more particular object is to provide such a gate valve and actuator which does not require substantially more space or headroom than that occupied by prior valves and actuators of the type described.

Still another object is to provide such a gate valve and actuator in which the handwheel may be turned with a minimum of effort; and, more particularly, to provide such a valve and actuator which may be manually operated without auxiliary power assist.

There are other occasions, in which it is necessary that the valve fail, and thus be closed or opened, as the case may be, essentially instantaneously in the presence of a fire or other high temperature environment. This capability may be desirable in addition to the capability of the valve to fail because of the occurrence of one or more abnormalities, such as a line pressure condition or the like. It is therefore a further object of this invention to provide a fail safe gate valve and actuator in which the handwheel is rendered inoperable to return the gate to its original position upon the occurrence of such a predetermined environmental temperature condition.

There are also occasions in which field personnel at locations remote from the valve may need to know whether or not it has been returned, following failure, to its controlled position, and thus, for example, whether it is maintained in such position in response to a control fluid pressure. It is therefore a further object to provide a gate valve and actuator of the type above described which is of such construction as to automatically indicate to a remote viewer in which position the gate is located.

Valves of this type in which the control fluid pressure is pneumatic require considerably greater pressure responsive area than do valves in which it is hydraulic. Thus, actuators for gate valves of otherwise similar constructions may differ to a considerable extent, depending on the nature of the control fluid. As a result, it may be expensive for a manufacturer to provide a "line" of such fail safe valves having a large number of interchangeable parts. It is therefore a still further object of the invention to provide a gate valve and actuator of the type described in which the pressure responsive mechanism may be made responsive to either pneumatic or hydraulic control fluid with a minimum of change and alteration.

These and other objects are accomplished, in accordance with the illustrated embodiments of the invention, by a fail safe gate valve and actuator of the type above described in which the handwheel is rendered inoperable to move the gate to its original, controlled position, upon reestablishment of the controlled condition, automatically in response to a control signal. The control signal may be automatically responsive to the reestablishment of the controlled condition, or it may be responsive to the failure of such condition. Also, the controlled condition may be a predetermined pressure fluid condition, such as that of the fluid to be supplied to the actuator, as above described, or to a predetermined environmental temperature condition, or to both such conditions. In certain embodiments, wherein the gate valve is similar to prior valves of the type described, the handwheel is rendered inoperable in response to the same control fluid which maintains the gate in its controlled position prior to failure.

In the illustrated and preferred embodiments of the invention, the means for rendering the handwheel inoperable comprises means which is shiftable between a first position rotatably connecting the handwheel and stem, whereby the gate may be moved to its original position in response to rotation of the handwheel, and a second position rotatably disconnecting the stem and handwheel so that the handwheel is inoperable to move the stem to its original position following failure. More particularly, in certain embodiments of the invention, as above mentioned, the connecting and disconnecting means is automatically shifted to its second position in response to the supply of a control fluid to the piston means for overcoming the spring means, whereby, upon return of the system in which the valve is installed to a pressure control responsive condition, the pressure responsive mechanism of the valve may not be overridden by rotation of the handwheel so that the valve qualifies under the standards set up fo "fail safe" gate valves of this type.

In the illustrated embodiments of the invention, the means for connecting and disconnecting the stem and handwheel includes a rotatably mounted nut threadedly connected to the stem, and means on the handwheel shiftable into and out of engagement with the nut. More particularly, the handwheel has a shaft which is mounted within the bonnet for rotation and reciprocation between inner and outer positions, and the shaft has means thereon for rotative engagement with the nut upon movement of the handwheel into one of its positions. Preferably, the nut is a ball nut which has high mechanical advantage so as to lessen power requirements to manipulate the handwheel; and, in fact, upon disconnection of the handwheel and nut, would, due to the spring means and line pressure acting on the stem, permit the stem to be moved in the opposite direction and thus move the gate to its fail position. A means is therefore provided for movement into engagement with the ball nut to prevent rotation thereof in a direction to move the stem in its opposite direction, upon shifting of the handwheel into rotative engagement with the nut, and out of engagement therewith to permit such rotation, upon shifting of the handwheel out of rotative engagement with the nut.

In one embodiment of the invention, wherein the control fluid is pneumatic, the piston means for urging the gate to fail position comprises a cylinder in the bonnet and a piston on the stem sealably slidable in the cylinder. In this embodiment, additional piston means provided on the handwheel shaft is responsive to control fluid for shifting the connecting and disconnecting means to its second position. Preferably, the pneumatic control fluid is introduced to and exhausted from a pressure chamber formed on one side of the piston in the cylinder which is common to the piston means on the handwheel shaft.

In another embodiment of the invention, wherein the control fluid is hydraulic, the piston means for maintaining the gate in its original position, prior to failure, comprises a plurality of cylinders arranged on the bonnet about the stem and nut, and a piston sealably slidable within each cylinder and engageable with a part on the stem for urging it in a direction to so maintain the gate. In this latter embodiment, the additional piston means is provided in the bonnet beneath the handwheel and arranged to respond to control fluid for engaging and shifting the handwheel to its disconnected position.

In the preferred embodiment of the invention, wherein the actuator stem is threadedly received by a ball nut, the means on the shaft for rotatably engaging the ball nut comprises dogs or teeth movable into and out of operative rotative engagement with circumferentially spaced-apart slots on the nut, and the means for preventing retrograde rotation of the ball nut comprises a pawl mounted for reciprocation in the bonnet to one side of the shaft between an inner position engaged with one of the slots and an outer position disengaged therefrom. More particularly, the pawl is yieldably urged to its inner position and the shaft has means thereon for moving the pawl with it to their outer positions.

In the drawings, wherein like reference characters are used throughout to designate like parts.

Figures 1, 2, 4:
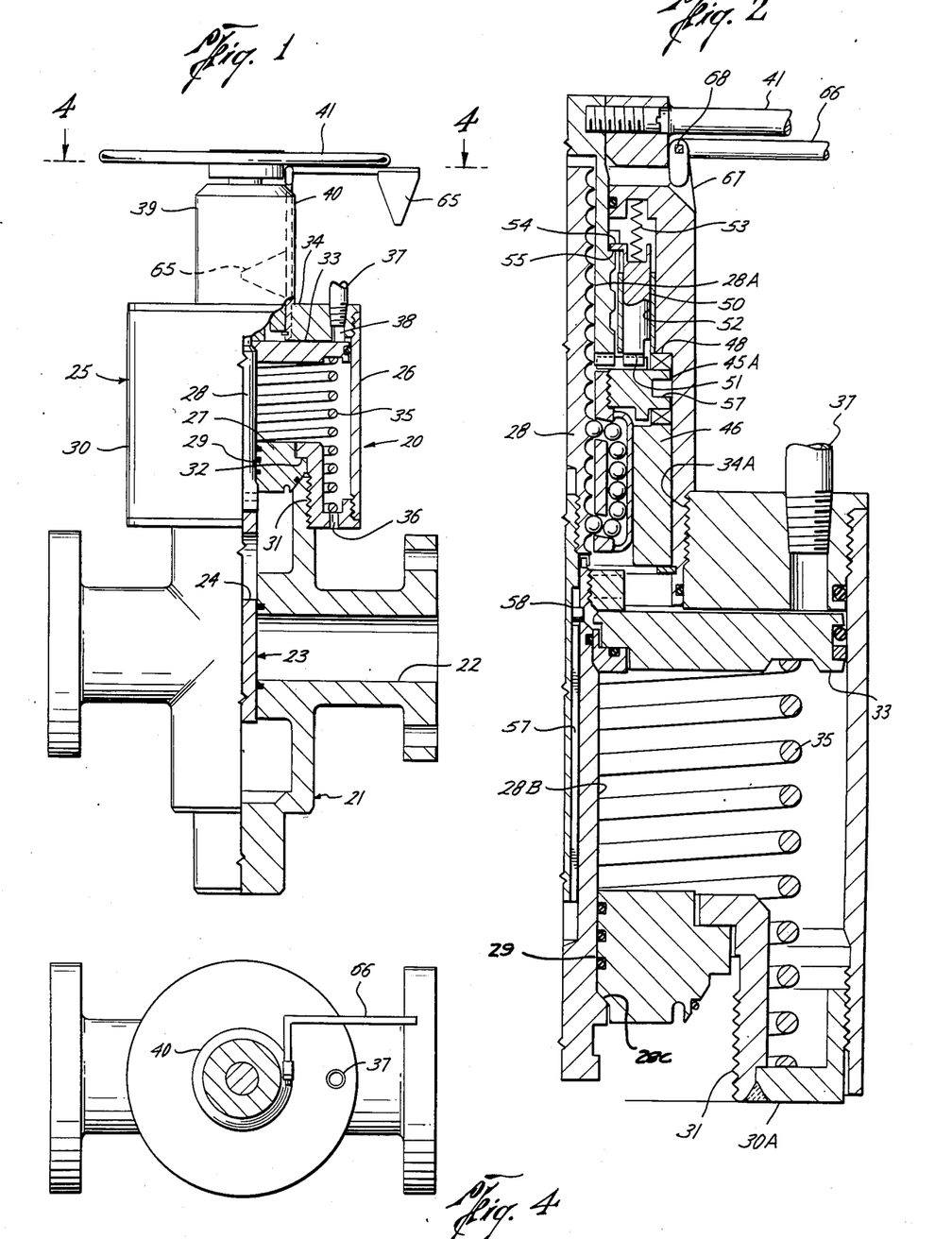
FIG. 1 is a side view of the one embodiment of a fail safe valve made in accordance with this invention wherein the control fluid pressure is pneumatic, the left hand side of the valve being in elevation and the right hand side being in vertical cross section to illustrate the gate moved to its upper, closed position upon removal of control fluid pressure to which the means for moving the stem is responsive.
FIG. 2 is an enlarged vertical sectional view of the actuator of the valve of FIG. 1, with the stem thereof raised following closing of the gate, and the handwheel lowered to engage with the nut for manually rotating the stem, whereby the valve may be returned to open position by rotation of the handwheel, and also showing a flag rotated to a raised position to indicate lowering of the handwheel.
FIG. 4 is a horizontal sectional view of the upper end of the valve of FIG. 1, as seen along broken lines 4—4 thereof.

With reference now to the above-described drawings, the valve 20 shown in FIG. 1 includes a valve body 21 having a flowway 22 therethrough and flanges on its opposite ends to enable the valve to be connected in a pipeline with its flowway aligned with the axis of the pipeline. A gate 23 mounted for vertical reciprocation within the cavity of the valve body has a port 24 therethrough which is raised above the flowway, in the closed position of FIG. 1, and aligned with the flowway, in the open position (not shown).

An actuator 25 for moving the gate between its opened and closed positions includes a bonnet 26 adapted to be mounted on the valve body and having a lower end wall 27 for closing the upper end of the body cavity when the bonnet is mounted thereon. A stem 28 is mounted for reciprocation within the bonnet 26 and has a lower end which extends sealably through a hole 29 in the bonnet end wall 27 for releasable connection with the upper end of the gate. As shown, this connection comprises a "T" on the lower end of the stem 28 which fits within a correspondingly shaped slot in the upper end of the gate.

The bonnet 26 includes a cylindrical housing 30 having a depending, outer annular portion 30A which has threads 31 about its inner diameter for connection with threads about an upstanding portion of the valve body to connect the housing and the valve body. An inwardly turned flange on the upper end of housing portion 30A bears upon an upwardly facing shoulder on the end wall 27 of the bonnet to hold the wall tightly against the upper end of the neck of the upper end of the valve body when the housing 30 is threadedly connected thereto.

A flange 33 is fixedly connected to the stem 28 for reciprocation therewith the housing, and is urged toward an upper position in which a shoulder 28C thereon engages a shoulder on wall 27 beneath hole 29 by means of a coil spring 35 acting between the flange and the lower end of the depending portion 30A of the housing. More particularly, in the pneumatic embodiment of the fail safe valve of FIGS. 1 to 11, the outer circumference of the flange extends close to inner circumference of housing 30 and carries a seal ring thereabout for slidably sealing within the housing. Thus, flange 33 serves as a piston which, as will be described, is adapted to be urged downwardly by control fluid in opposition to the upward force due to spring 35 and line pressure within the valve body acting over the area of stem 28 slidable within hole 29. The lower end of the depending annular portion 30A of the housing is ported at 36 to vent the housing beneath the piston.

As will be described in detail to follow, an upward extension 39 of the bonnet above the housing 30 is enclosed or sealed off so as to form with the housing above the piston flange 33 a variable volume pressure chamber for the control fluid. A pipe 37 connects with a port 38 in the upper end wall 34 of the bonnet housing to permit control pressure to be supplied to or removed from this chamber, and in use of the valve in a system of the type contemplated by the present invention, this control fluid will provide sufficient force to overcome that of the spring 35 and line pressure to maintain the piston and stem 28 in their lowered positions (FIG. 3) and thus hold the gate in its open position. As previously described, upon removal of the control pressure from the pressure chamber, the forces due spring 35 and line pressure lift the piston and the stem back to the positions of FIG. 1 to close the gate. However, upon removal of the control fluid, the spring is capable of closing the gate, even in the absence of pressure in the line.

Figures 3, 5, 6, 7:
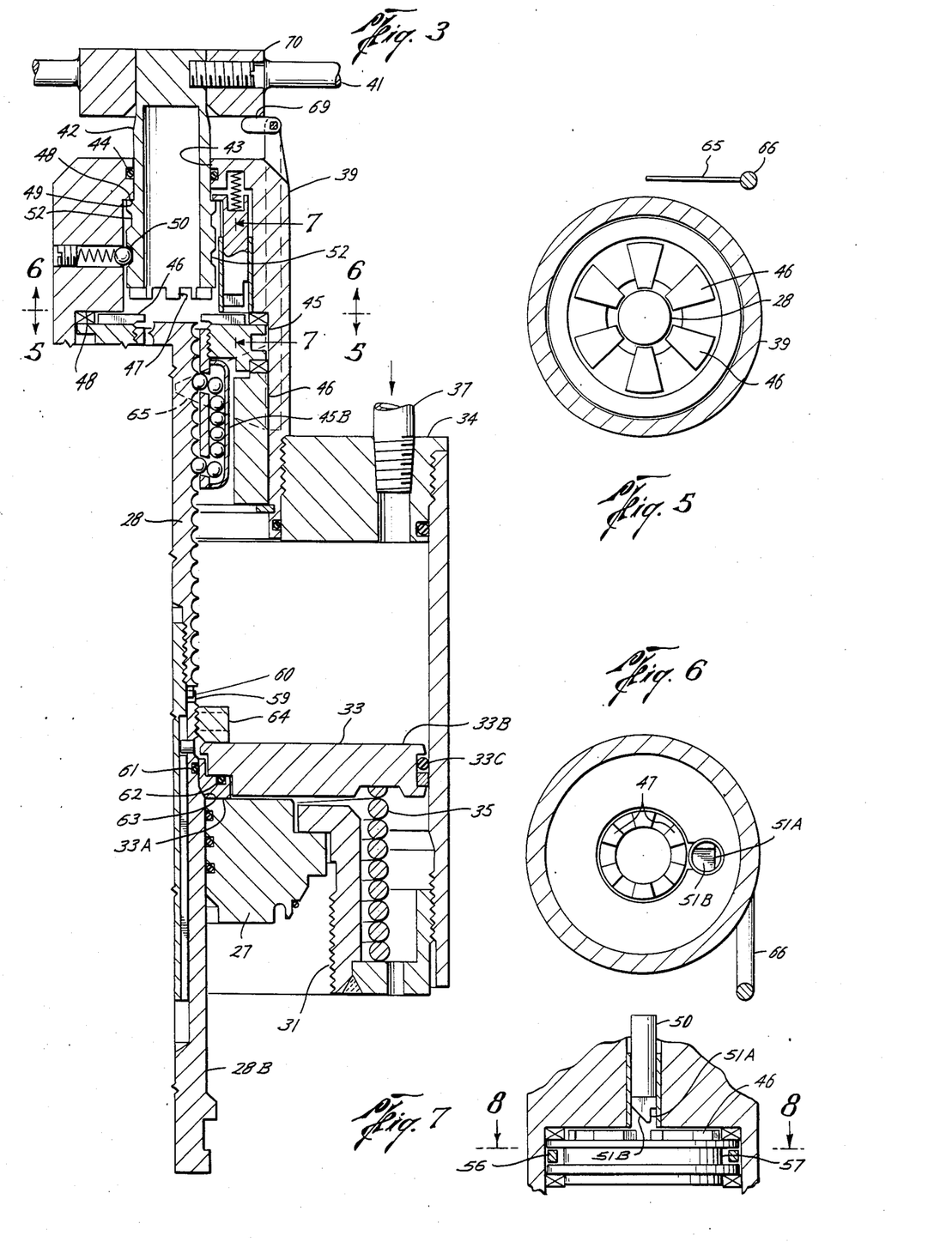
FIG. 3 is a vertical sectional view of one side of the actuator of FIGS. 1 and 2, similar to FIG. 2, but upon the supply of control fluid pressure to the pressure chamber of the actuator to raise and thereby disengage the handwheel from the nut and maintain the stem in its lower position to hold the valve open, and thus restore the system to pressure control responsive condition, and also showing the flag released by lifting of the handwheel to rotate to a lowered position to indicate raising of the handwheel.
FIG. 5 is a cross-sectional view of the actuator, looking downwardly from broken lines 5—5 of FIG. 3.
FIG. 6 is another cross-sectional view of the actuator, looking up from broken line 6—6, of FIG. 3.
FIG. 7 is a vertical sectional view of a portion of the actuator, as seen along broken lines 7—7 of FIG. 3, to show the lower end of the pawl raised from rotative engagement with the nut.

The bonnet extension comprises a tubular body 40 which is of considerably less diameter than the bonnet housing 30 and which has a lower end threadedly received within a central opening 34A in the top end wall 34 of the housing. The axis of the extension is aligned with the housing so as to receive the upper end portion of the stem centrally thereof. As best shown in FIG. 3, a handwheel 41 is mounted for rotation on the upper end of housing extension 39 by means of a shaft 42 which depends from the center of the handwheel for rotation within an opening 43 in the upper end of the tubular housing 40. More particularly, and as will be described, the shaft is reciprocable coaxially of stem 28 between an upper position (FIG. 3) disengaged from the stem, and a lower position (FIG. 2) in which it is rotatively connected to the stem. The shaft is rotatable and reciprocable within an O-ring 44 within the opening 43 so as to sealably enclose the upper end of the housing extension, and, thus with the housing above piston flange 33, provides a piston which, with piston 33, defines the pressure chamber within the bonnet with which control line port 38 connects.

A nut 45 is mounted for rotation within the bonnet extension beneath the lower end of handwheel shaft 42. More particularly, the nut is of a ball type having a ring 45A at its upper end which is fixed against axial movement by a lower bearing on the upper end of a sleeve 46 supported within the bonnet extension by means of a snap ring 47, and an upper bearing which is held beneath a downwardly facing shoulder 48 on the reduced diameter portion of the upper end of the bonnet extension. As shown in the drawings, the nut 45 also includes a ball race housing 45B depending from the ring 45A, and the upper end portion of the stem 28 extends upwardly through the inner diameter of the ball nut and into the lower hollow end of the handwheel shaft 42. As shown, the balls within the ball race housing engage with matching grooves on the upper end portion of the stem so that, as the nut is rotated in a clockwise direction (looking down), the stem is caused to move downwardly and thus lower the gate to its open position.

As best shown in FIG. 5, the upper end of the support ring of the nut 45 has circumferentially spaced slots beneath the lower end of the shaft 42. As best shown in FIG. 6, the lower end of the shaft 42 has circumferentially spaced teeth 47 adapted to fit within the slots 46 when the handwheel and thus its shaft are lowered to position of FIG. 2, so as to rotatably connect the shaft and nut. When the handwheel is raised to move the lower end of its shaft out of and into rotative connection with the nut, a shoulder 48 about the shaft engages a downwardly facing shoulder 49 in the housing beneath opening 43 to prevent removal of the handwheel.

The handwheel and thus its shaft are located in the upper position by means of spring-pressed ball detents 50 which are carried by the bonnet extension and movable, when the shaft is raised, into a lower annular groove 51 thereabout. Another annular groove 52 is formed about the shaft above the groove 51 so as to receive the ball detents 50 when the handwheel and shaft are lowered from the upper position to the lower position of FIG. 2.

As well known in the art, because of its mechanical efficiency, a ball nut lowers the power requirements in operating the handwheel to lower the stem, as compared with more conventional jack screw arrangements. In fact, if the handwheel were raised from the position of FIG. 2 to the postion of FIG. 3 so as to disconnect the shaft from the nut, the force of the spring 35 and the force due to line fluid acting over the cross-sectional area of the stem extendible through hole 29 would allow the gate to rise from its open position to its closed position.

In accordance with the present invention, however, when the shaft on the handwheel is lowered to rotatably engage the nut, the nut is held against retrograde movement—i.e., in a counterclockwise direction looking downwardly on the nut—by means of a pawl 50 having a ratchet tooth 51 on its lower end and carried within a bore 52 in the upper reduced diameter portion of the bonnet extension (see FIG. 6) for movement vertically into and out of engagement with one of the slots 46 on the top side of the nut. As shown in FIG. 7, the front side of the ratchet tooth 51 is formed with a vertical face 51A, while the back side thereof is tapered at 51B so that, when the pawl is lowered with the handwheel shaft 42, as will be described below, its face 51A will engage one side of the slot in the nut to prevent retrograde movement of the nut, while its tapered face will be free to ride up and over the other side of the slot upon clockwise rotation of the nut with the handwheel shaft. The pawl is urged downwardly to its lower position by mean of a coil spring 53 acting between its upper end and the top wall of the bonnet extension, and a flange 54 on the upper end of the pawl is supported on an upwardly facing shoulder 55 about the handwheel shaft so that the pawl will move downwardly and upwardly with the shaft, as the shaft is shifted by the handwheel, but, when lowered, will rise and fall as it ratchets over the nut.

Figure 8:
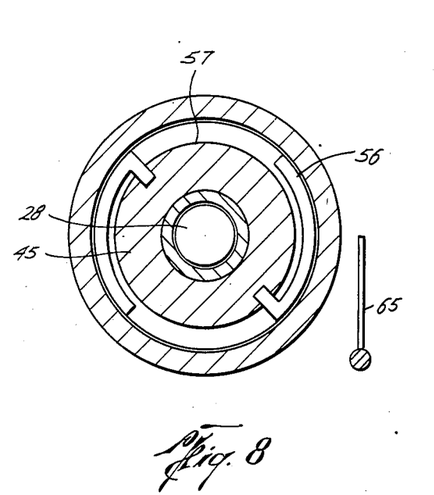
FIG. 8 is another cross-sectional view of the actuator of FIGS. 1 to 7, as seen along broken lines 8—8 of FIG. 7, to show brake shoes carried by the nut for engagement with the bonnet to retard upward movement of the stem upon lifting of the handwheel to the disengaged position of FIG. 3.

Following clockwise handwheel rotation to rotate the nut and lower the stem and thereby open the valve, the handwheel may be raised to disengage it from the nut. Since the pawl is also lifted therefrom, the nut is free to move in a counterclockwise direction, and, due to the mechanical efficiency of the ball nut, the force due to the coil spring 35 as well as line pressure acting upon the stem 28 will cause the stem to rise, and the nut to counter rotate in order to lift the gate to closed position. Brake shoes 56 are carried within an annular groove 57 about the support ring of the nut to frictionally engage the inner diameter of the bonnet extension, as best shown in FIG. 8, in order to retard the counterclockwise rotation of the handwheel as the stem is being raised, and thus reduce the impact of shoulder 28C on the stem with the shoulder on bonnet wall 27 beneath hole 29.

As previously described, and as will be apparent from the foregoing description, the extension of shaft 42 sealably within O-ring 44 of the housing extension of the bonnet provides a piston which is urged upwardly to disengage the shaft from the nut by the supply of control fluid to the pressure chamber of the bonnet. For example, with reference to FIG. 2, with the stem raised to close the valve, as may have occured due to removal of control fluid, the system may be returned to a control fluid responsive condition by the supply of control fluid to the pressure chamber, which move the piston flange 33 downwardly to return the gate to open position. At the same time, control fluid acts upon the piston area of the shaft 42 so as to raise the shaft and handwheel, and thus disengage its teeth and the pawl from the nut. Consequently, as long as control fluid remains in the pressure chamber of the housing, the handwheel is positively held out of rotative engagement with the nut, thereby preventing the inadvertent manual manipulation of the handwheel. More particularly, the handwheel will remain in its upper position, even following removal of control fluid, and thus closure of the valve, until manually pushed downwardly to its nut engaging position.

Stem 28 is preferably comprised of axially extendible and contractible upper and lower ends 28A and 28B, respectively. As shown, the upper end is threadedly connected to the nut, and the lower end is fixed to piston flange 33 and extends sealably through the hole 29 for connection with the gate. More particularly, the upper and lower ends of the stem are connected for rotation with one another by means of a spline 57 formed on the lower portion of the upper end of the stem which is received within a hollow upper portion of the lower end 28B, and a pin 58 on the upper portion of the lower end 28B of the stem for sliding vertically within the spline 57. As shown in FIG. 2, as the upper and lower ends of the spline move into retracted position, pin 58 moves out of the spline 57, and the upper and lower ends of the stem are maintained in rotative engagement with one another by means of a dog 59 on the upper end which moves into a slot 60 in the lower end of the stem. Thus, as shown, the upper end of the stem is made up of an upper, relatively large portion which has pin 59 formed thereon, and a lower, relatively small portion which has the spline 57 formed therein. Consequently, when the upper and lower ends of the stem are in their fully retracted position, torque is transmitted directly from the larger upper portion directly to the lower end, rather than through the lower smaller portion in which the spline 57 is formed.

As will be understood, this two-piece stem enables the lower end of the stem to rise and fall with piston 33 to lift and lower the gate without rotating the nut, and thus eliminates unnecessary wear on the nut. Even if the upper end of the stem is partially lowered within the nut, from the position of FIG. 2 to the position of FIG. 3, this two-piece stem construction will reduce to at least some extent the need for rotating the nut as the lower end of the stem is lifted its full stroke to raise the gate from its open to its closed position.

Piston flange 33 is of special construction to accommodate for eccentricity between the axis of the stem and the inner circumference of the cylinder in the bonnet in which the piston is sealably slidable. Thus, the flange includes an inner disc 33A carried by the lower end 28B of the stem, and an outer disc 33B which carries an O-ring 33C in a groove about its outer circumference for sealably sliding within the cylinder. More particularly, the outer disc has an inner circumference somewhat larger than the outer circumference of the inner disc so as to overlap therewith and permit limited radial sliding of the outer disc with respect to the inner disc. The inner diameter of the inner disc is sealed with respect to the lower end of the stem by means of an O-ring 61 carried by the stem, and the inner and outer discs are sealed with respect to one another by means of an O-ring 62 carried within a groove in the upper face of inner disc 33 to form a sliding seal with respect to an overlapping, opposed lower face of the outer disc 33B. Inner disc 33 is held down on a shoulder 63 about the lower end of the stem, and outer disc 33B is held downwardly upon the inner disc 33A, by means of a nut 64 threadedly engaged with the upper end of the lower end of the stem. The nut 64 is of course made up with the stem only to the extent necessary to retain the piston flange on the stem, without interfering with radial movement of the outer disc of the piston flange with respect to the inner disc thereof.

As also previously described, a flag 65 is mounted on the actuator bonnet for rotating between an outer, raised position with respect to the bonnet, so as to indicate that the handwheel has been lowered into rotative engagement with the nut, and an inner position lowered along the side of the housing extension, as indicated in broken lines in FIGS. 1 and 3, to indicate that the handwheel is raised out of rotative engagement therewith. Thus, the flag is carried on the outer end of arm 66 which is pivotally connected to a member 67 extending upwardly from the upper end of the housing extension to one side thereof. More particularly, the inner end of the arm is pivotally connected to member 67 by means of a pin 68 to permit it to swing from a generally horizontal position in which it raises the flag 65 to its handwheel lower indicating position, and a depending position in which it lowers the flag to indicate that the handwheel is out of rotative engagement with the nut.

As will be appreciated, the arm and flag normally assume the depending position. However, they are moved to their outwardly extended positions by means of a finger 69 extending from arm 66 at a right angle with respect to the arm 66 beneath a mounting ring 70 at the center of the handwheel which is releasably secured over the upper end of the stem. Thus, as the handwheel is lowered, the lower end of mounting ring 70 engages finger 69 to swing it downwardly to a position in which the arm 66 is swung outwardly to its generally horizontal position. The flag is held in its outwardly extending position by engagement of the outer diameter of the mounting ring 70 with the inner side of the finger 69 when it has been swung downwardly, as best shown in FIG. 2.

Figure 9:
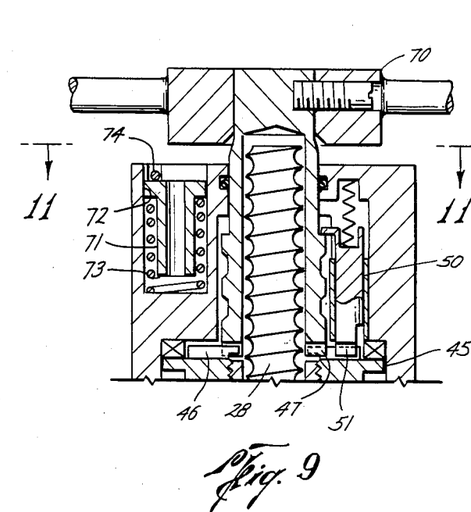
FIG. 9 is another vertical sectional view of the upper end of the actuator of FIGS. 1 to 7, to show the mechanism for lifting the handwheel from engaged position with respect to the nut automatically in response to a predetermined environmental temperature condition.
Figure 10:
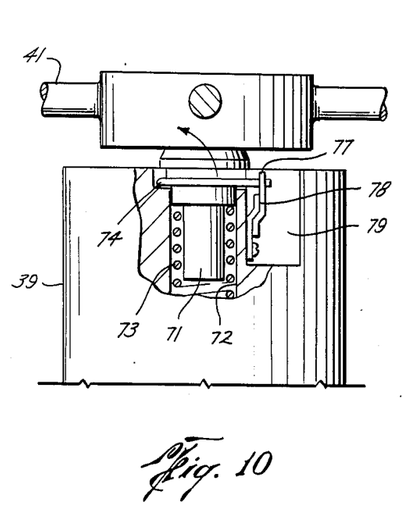
FIG. 10 is another view of the upper end of the actuator of FIGS. 1 to 7, broken away in part to show the mechanism shown in FIG. 9 from the left hand side thereof.
Figure 11:
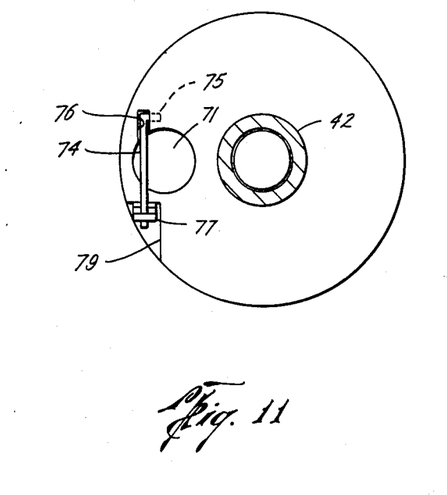
FIG. 11 is a view of the upper end of such actuator, as shown along broken lines 11—11 of FIG. 9.

The means by which the handwheel is automatically moved to its upper position in response to a predetermined high temperature environment about the valve is shown in FIGS. 9 to 11 to comprise a rod 71 which is vertically reciprocable within a cylindrical opening 72 formed in the upper end of the housing extension beneath the mounting ring 70 of the handwheel. More particularly, the upper enlarged end of the rod 71 is guidably sliding within opening 72 between the lower position shown in FIGS. 9 and 10, and an upper position in which the upper end of the rod moves out of the opening 72 to engage and lift the mounting ring 70 of the handwheel to its upper position. Thus, the rod is yieldably urged toward its upper position by means of a coil spring 73 received about its reduced diameter lower end and acting between the enlarged diameter upper end thereof and the lower end of opening 72.

The rod is held in its withdrawn position of FIGS. 9 and 10 by means of a wire rod 74 releasably held across the opening 72 to bear upon the upper enlarged end of the rod 71. One end 75 of the wire rod is received in a hole in one side of a slot 76 in the housing extension so as to form a pivot about which the wire rod may swing in a counterclockwise direction as indicated by the arrow of FIG. 10 to release the rod 71 for upward movement to lift the handwheel. The opposite end of the wire rod is normally held by means of a heat fusible element 77 supported by a bracket 78 fixed to a cutout recess 79 in a side of a housing extension. As shown, the upper end of retainer piece 77 is disposed over the free end of the wire rod 74 so as to hold the wire rod in its generally horizontal position until element 77 fuses in the presence of the high temperature environment. Of course, when this occurs and the handwheel is lifted to disconnect from the nut, the nut is free to rotate so that the stem may be raised by the spring 35 and the force of line fluid in order to permit the gate to fail closed.

Figure 12:
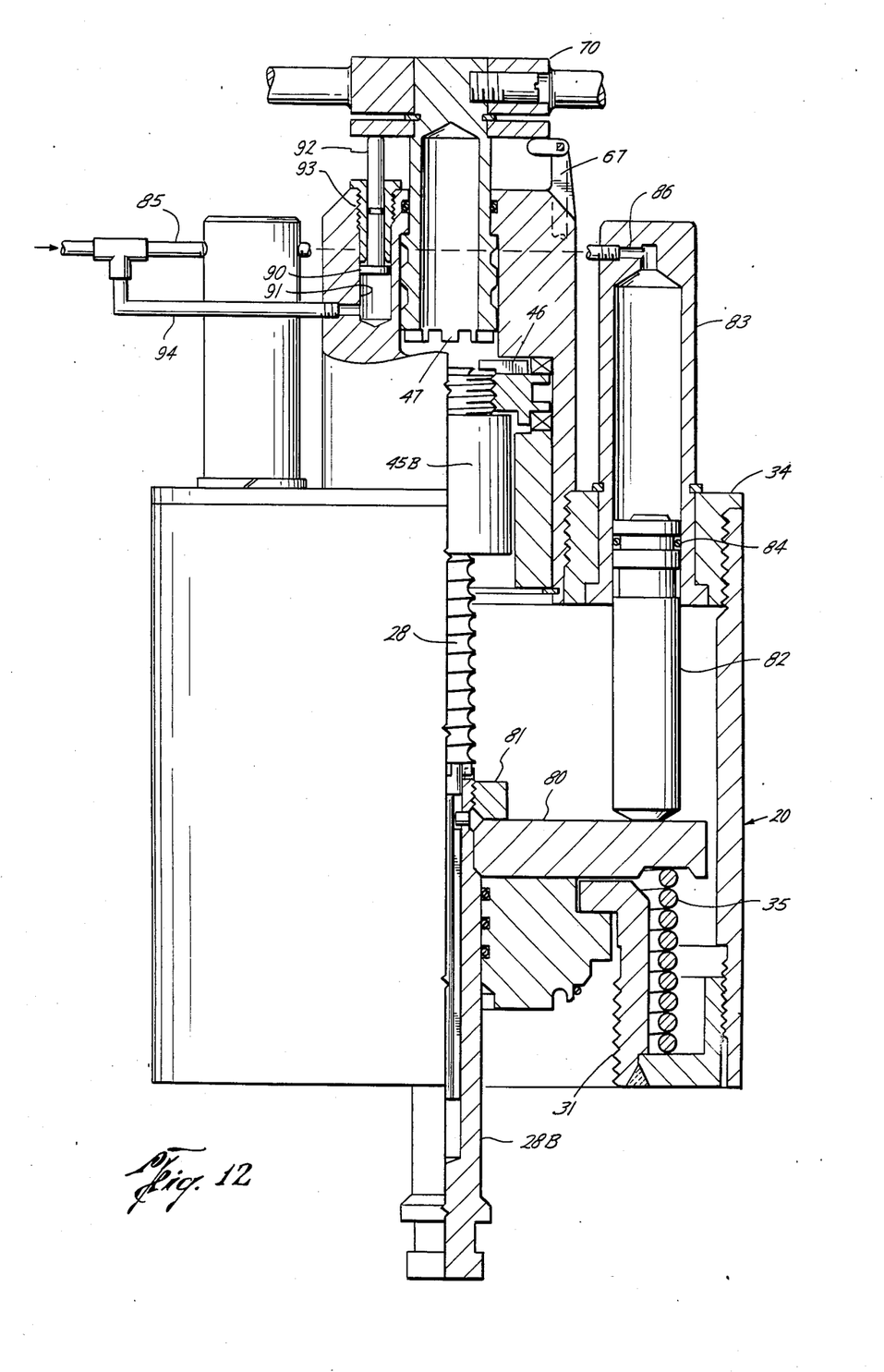
FIG. 12 is a side view of the another embodiment of the fail safe valve constructed in accordance with the present invention, in which the control fluid is hydraulic, with the right hand side thereof and the upper end of the left hand side being shown in section.

The embodiment of the fail-safe valve shown in FIG. 12 is substantially identical to the embodiment above described except in the construction of the mechanism which is responsive to supply of control fluid in order to normally maintain the valve in its open position and then permit it to fail close upon removal of control line fluid. Thus, with reference to FIG. 12, a flange 80 is fixed to the lower end 28B of the stem by means of a nut 81 and is urged upwardly by means of a coil spring 35 mounted within the bonnet as described in connection with the hydraulic embodiment. However, in this hydraulic embodiment, the flange and thus the stem are urged downwardly by a series of pistons 82 reciprocable within cylinders formed within tubular bodies 83 mounted on the upper wall 34 of the bonnet housing in circumferentially spaced-apart relation about the housing extension. Thus, the flange 80 terminates short of the inner circumference of the bonnet housing so as to avoid contact therewith as it is reciprocated within the bonnet housing in response to the supply and removal of control fluid to and from the cylinders within tubular bodies 83.

The upper end of each of the pistons 82 carries an O-ring 84 thereabout for sealably sliding within its cylinder, and is of such length as to cause its lower end to bear upon the upper side of flange 80 and move the flange to its lowermost position to retain the valve in open position in response to the supply of control fluid. Control fluid is supplied to and removed from each of the cylinders through a common line 85 leading from a source of hydraulic fluid and having branch lines leading to ports 86 in the upper ends of the cylinders.

Thus, although the shaft 42 on the handwheel is shown to be sealably received in the opening 43 in the upper end of the housing extension, this is primarily for the purpose of preventing debris from access to the ball nut and its associated parts. That is, there is no need for the containment of pressure within a chamber formed within the bonnet housing. Instead, the means by which the handwheel is automatically moved from its lower to its upper position in response to the supply of control fluid to the cylinders for pistons 82 comprises one or more pistons 90 slidable within cylinders 91 formed in the upper end of the housing extension beneath the mounting ring of the handwheel. Rods 92 on these pistons extend sealably through bearings 93 so as to engage with the lower side of the mounting ring of the handwheel. As will be understood from FIG. 12, in the lower position of the piston 90, rod 92 is lowered to a position in which it does not interfere with downward movement of the mounting ring with the handwheel.

On the other hand, upon upward movement of the piston 90 to the position shown in FIG. 12, the upper end of the rod 92 engages the mounting ring to force the handwheel to its raised position. Control fluid from a source common to that supplied to cylinders 83 is supplied to the lower end of piston 90 by means of line 94 branching from line 85 and leading to the lower end of the cylinder 91. Consequently, and as above described, as control fluid is supplied to each of the pistons 82 for maintaining the gate in its open position, the handwheel is automatically lifted to its upper position to disengage its shaft 42 from the nut by which the stem is manually actuated.

It will be understood that the valve actuator of FIG. 12 is otherwise identical to that of FIGS. 1 to 11. Thus, as indicated in FIG. 12, an arm may be mounted on the housing extension to support a flag 65. Also, although not shown in FIG. 12, it will be understood that the valve actuator includes a pawl of the construction and adapted to function in the manner of the pawl 50 described in connection with the pneumatic embodiment of FIGS. 1 to 11. Additionally, of course, it may be provided with means such as that shown in FIG. 9, for causing the gate to fail closed responsive to a predetermined environmental temperature condition.

Figure 13:
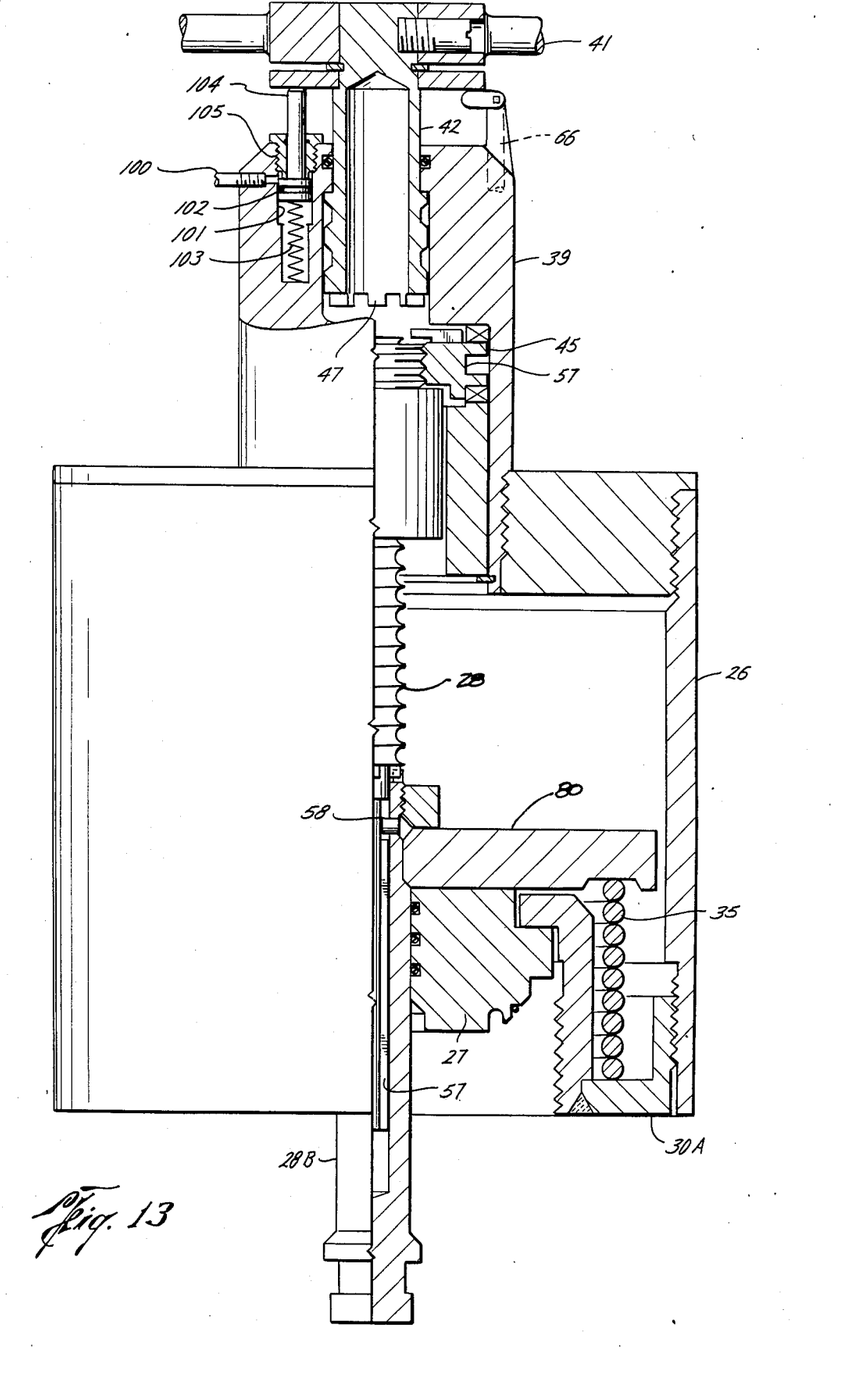
FIG. 13 is a side view of still another embodiment of the invention wherein the gate is caused to move to fail position automatically when the handwheel is lifted in response to the failure of a control fluid, the right hand side and the upper end of the left hand side thereof being shown essentially in section, much in the case of FIG. 12.

The fail safe gate valve and actuator of FIG. 13 is similar in construction to each of the embodiments of FIGS. 1 to 11 and 12, insofar as the construction and operation of the handwheel, nut and stem are concerned. Also, it is similar to FIG. 12 in that a flange 80 is fixed to the stem 28 and is urged upwardly by spring 35, as well as other respects which will be apparent from the drawings. In this valve, the gate is maintained in its controlled, open position by lowering of the handwheel to rotatably connect with the stem, in response to a control fluid pressure, and subsequent rotation of the handwheel to lower the stem. However, upon raising of the handwheel due to the failure of control fluid, as shown in FIG. 13, the stem is free to be lifted under the urging of spring 35 and line pressure, as in the case of the other embodiments.

As shown, control fluid is supplied through a line 100 into a cylinder 101 formed in the upper end of the bonnet extension beneath the mounting ring of the handwheel, and a piston 102 is sealably slidable within the cylinder between a lower position when control fluid is supplied through line 100, and the illustrated upper position, under the urging of a coil spring 103 beneath it, when the control fluid is removed. At this time, of course, the stem and thus the gate are raised from the positions shown in FIG. 13 under the urging of spring 35 and line fluid. Thus, as in the case of the rod 92 described in connection with the valve of FIG. 12, a rod 104 extending upwardly from the piston through a gland nut 105 in the upper end of the cylinder 101 is of such length as to permit the handwheel to be lowered into a position in which it rotatably engages the nut, when the piston is lowered, but to engage and lift the mounting ring of the handwheel to its upper position when the piston is raised upon failure of control pressure.

Of course, as mentioned in connection with FIG. 12, the valve and actuator of FIG. 13 may also have means, as shown in FIG. 9, for lifting the handwheel in response to a predetermined environmental temperature, as well as a flag for visually indicating the position of the handwheel.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A fail safe valve, comprising a body having a flowway therethrough and a closure member movable therein between positions opening and closing the flowway, an actuator having a stem including one portion connected to the closure member and mounted for reciprocation in opposite directions to move the closure member between said positions, piston means responsive to the supply of a control fluid thereto for urging the one stem portion in one direction in order to move the closure member to one position and maintain it in that position as long as the control fluid is maintained at a predetermined pressure level, means for yieldably urging the one stem portion in the other direction in order to move the closure member to its other position in the event the control fluid is not so maintained, operating means mounted on the actuator and manipulatable from the exterior thereof for moving another portion of the stem in the one direction to move the closure member to its one position, and means automatically responsive to the failure of a predetermined environmental temperature condition for rendering said operating means inoperative to move said other portion of the stem in said one direction upon reestablishment of said control fluid to said piston means at said predetermined pressure level.

2. A fail safe valve of the character defined in claim 1, wherein said means is also automatically responsive to the supply of control fluid to said piston means at said predetermined pressure level.

3. A fail safe valve, comprising a body having a flowway therethrough and a closure member movable therein between positions opening and closing the flowway, an actuator having a stem including one portion connected to the closure member and mounted for reciprocation in opposite directions to move the closure member between the said positions, means for yieldably urging the one stem portion in a direction to move the closure member from one position in which it may be maintained under a predetermined temperature condition to its other position upon failure of such condition, operating means mounted on the actuator for manipulation from the exterior thereof into one position in which it is operative to move another portion of the stem in the other direction in order to move the closure member to its one position, and another position in which the operating means is inoperative to move said other stem portion in said other direction, and means automatically responsive to failure of said temperature condition for moving said operating means from said one to its other position so that it is inoperative to move the closure member to its one position upon reestablishment of said temperature condition.

4. A fail safe valve, comprising a body having a flowway therethrough and a closure member movable therein between positions opening and closing the flowway, an actuator having a stem including one portion connected to the closure member, a member threadedly connected to another portion of the stem and mounted in the body for rotation without reciprocation, means for yieldably urging the one stem portion in the other direction to move the closure member from its one position, in which it may be maintained under one or more controlled conditions, to its other position upon failure of one of those conditions, operating means mounted on the actuator for manipulation from the exterior thereof, means shiftable between a first position rotatably connecting the operating means and the member for moving the stem in the one direction only in response to manipulation of the operating means, and a second position rotatably disconnecting the member and operating means so that the operating means is inoperative to move the stem in said one direction or resist movement of the stem in the opposite direction, and means automatically responsive to a control signal for shifting said shiftable means from the first to its second position so that the operating means is inoperative to move the closure member to said one position upon reestablishment of said one controlled condition.

5. A fail safe valve of the character defined in claim 4, wherein one of the member and other stem portion is a ball nut, and a means is movable into engagement with the member to prevent rotation thereof in a direction to move the stem in the other direction upon shifting of the connecting and disconnecting means into rotatable connection with the member, and out of engagement therewith to permit such rotation, upon shifting of the connecting and disconnecting means out of rotatable connection with the member.

6. A fail safe valve of the character defined in claim 4, wherein the operating means has a shaft which is mounted for rotation and reciprocation between inner and outer positions, and said shaft has means thereon for rotative engagement with the member upon movement of the shaft into one of said inner and outer positions.

7. A fail safe valve comprising a body having a flowway therethrough and a closure member movable therein between positions opening and closing the flowway, an actuator having a stem including a portion connected to the closure member, a member threadedly connected to another portion of the stem and mounted for rotation without reciprocation, piston means on the one stem portion, means for supplying control fluid to the piston means for urging the one stem portion in one direction in order to move the closure member to one position and maintain it in that position as long as the control fluid is maintained at a predetermined pressure level, means for yieldably urging the one stem portion in the other direction in order to move the closure member to its other position in the event the control fluid is not so maintained, operating means mounted on the actuator for manipulation from the exterior thereof, means shiftable between a first position rotatably connecting the operating means and the member for moving the stem in said one direction only in response to manipulation of the operating means to rotate the member, and a second position rotatably disconnecting the stem and member so that the operating means is inoperative to move the stem in said one direction or resist movement of the stem in the other direction, and additional piston means automatically responsive to the supply of said control fluid to said first-mentioned piston means for shifting said shiftable means to its second position.

8. A fail safe valve of the character defined in claim 7, wherein the piston means includes a plurality of cylinders arranged about the stem, and a piston sealably slidable within each cylinder.

9. A valve of the character defined in claim 8, wherein the operating means has a shaft mounted with the actuator for rotation and reciprocation between inner and outer positions, the shiftable means comprises means carried on the shaft for rotative engagement with the member upon movement of the shaft to its inner position, and the additional piston means is mounted within the actuator for extension with respect to the bonnet in response to the supply of said control fluid to move the shaft to its outer position.

10. A valve of the character defined in claim 7, wherein the piston means includes a cylinder in the actuator and a piston on the one stem portion and sealably slidable in the cylinder.

11. A valve of the character defined in claim 10, wherein the operating means has a shaft mounted within the bonnet for rotation and reciprocation therein between inner and outer positions, the connecting and disconnecting means comprises means carried on the shaft for rotative engagement with the member upon movement of the shaft into its inner position, and said additional piston means is on the shaft.

12. In a fail safe valve actuator, a body having a stem including a portion mounted therein for reciprocation in opposite directions, without rotation, a member threadedly connected to the stem portion, means mounting the member within the body for rotation, without axial movement, operating means mounted on the body for manipulation from the exterior thereof and having a shaft mounted within the body for rotation and reciprocation between inner and outer positions in axial alignment with the stem portion, means on the shaft rotatably engageable with means on the member, upon movement of the shaft to one position, so as to permit the member to be rotated by the operating means in one direction, and rotatably disengageable therefrom, upon movement of the shaft to its other position, so that the operating means is ineffective to move the stem, and means for preventing rotation of the member in the opposite direction when the means on the shaft is rotatably engaged with means on the member, but permitting such rotation when said means on the shaft is rotatably disengaged with said means on the member.

13. A valve actuator of the character defined in claim 12, wherein one of the member and stem portion is a ball nut.

14. A valve actuator of the character defined in claim 12, including brake means on the member frictionally engageable with the body to retard rotation of the member in said opposite direction.

15. A valve actuator of the character defined in claim 13, wherein the member is the ball nut.

16. A valve actuator of the character defined in claim 12, wherein the means for preventing rotation of the member comprises a pawl mounted for reciprocation with the shaft between one position rotatably engaged with the member, when the means on the shaft is rotatably engaged therewith, and another position disengaged therefrom when the means on the shaft rotatably disengaged therefrom, when the shaft is rotatably disengaged from the member.

17. A valve actuator of the character defined in claim 12, including detent means on the body and shaft for releasably holding the shaft in its other position.

18. A valve actuator of the character defined in claim 12, wherein the member has slots formed therein, and the inner end of the shaft has dogs movable into and out of rotative engagement with the slots.

19. A valve actuator of the character defined in claim 18, including a pawl mounted for reciprocation in the body to one side of the shaft between an inner position engaged with a slot on the member and an outer position disengaged therefrom.

20. A valve actuator of the character defined in claim 19, including means yieldably urging the pawl to its inner position, and means on the shaft for moving the pawl with it to their outer positions and for permitting the yieldable urging means to move the pawl to its inner position as the shaft moves to its inner position.

21. A valve actuator of the character defined in claim 12, including means on the body for visually indicating connection or disconnection of the shaft and member automatically in response to shifting of said shaft into and out of its positions.

22. A valve actuator of the character defined in claim 12, including means on the body for moving the shaft into its position disengaged from the member automatically in response to a predetermined environmental temperature condition.

23. A valve actuator of the character defined in claim 12, including means on the body for moving the shaft to its position disengaged from the member automatically in response to a fluid pressure control signal.

24. A valve actuator of the character defined in claim 22, wherein said means includes piston means on the shaft.

25. A fail safe valve actuator, comprising a bonnet adapted to be mounted on a valve body, a stem including one portion adapted to be connected to a closure member of the valve, when the bonnet is so mounted, means mounting the one stem portion within the bonnet for reciprocation in opposite directions to move the closure member between opened and closed positions, means for yieldably urging the one stem portion in a direction to move the closure member from one position in which it may be maintained under one or more controlled conditions to its other position upon failure of such condition, operating means mounted on the bonnet for manipulation from the exterior thereof for moving another portion of the stem in the opposite direction in order to move the closure member to its one position, and means automatically responsive to a predetermined environmental temperature condition for rendering said operating means inoperative to move said other stem portion in said opposite direction upon reestablishment of said one controlled condition.

26. A fail safe valve actuator of the character defined in claim 25, wherein the operating means is also rendered inoperative in response to a predetermined fluid pressure condition.

27. A fail safe valve actuator, comprising a bonnet adapted to mount on a valve body, a stem including one portion adapted to be connected to a closure member, when the bonnet is so mounted, means mounting the one stem portion within the bonnet for reciprocation in opposite directions to move the closure member between opened and closed positions, piston means responsive to the supply of a control fluid thereto for urging the one stem portion in one direction in order to move the closure member to one position and maintain it in that position as long as the control fluid is maintained at a predetermined pressure level, means for yieldably urging the one stem portion in the other direction in order to move the closure member to its other position in the event the control fluid is not so maintained, operating means mounted on the bonnet and manipulatable from the exterior thereof for moving another portion of the stem in the one direction to move the closure member to its other position, and means automatically responsive to the failure of a predetermined environmental temperature condition for rendering said operating means inoperative to move said other stem portion in said one direction upon reestablishment of the supply of said control fluid to said piston means at said predetermined pressure level.

28. An actuator of the character defined in claim 27, wherein said means for rendering the operating means inoperative is also automatically responsive to the supply of said control fluid to said piston means.

29. A fail safe valve actuator, comprising a bonnet adapted to be mounted on a valve body, a stem including one portion adapted to be connected to a closure member, when the bonnet is so mounted, means mounting the one stem portion within the bonnet for reciprocation in opposite directions to move the closure member between open and closed positions, means for yieldably urging the one stem portion in a direction to move the closure member from one position in which it may be maintained under one or more controlled conditions to its other position upon failure of one such condition, operating means mounted on the bonnet and manipulatable from the exterior of the bonnet for manipulation into one position in which it is operative to move another portion of the stem in the other direction in order to move the closure member to its one position, and another position in which the operating means is inoperative to move said other stem portion in said other direction, and means automatically responsive to failure of a predetermined environmental temperature condition for moving said operating means from its one to its other position so that the operating means is inoperative to move the closure member to its one position upon reestablishment of said one controlled condition.

30. An actuator of the character defined in claim 29, including means automatically responsive to manipulation of the operating means for visually indicating in which position it is located.

31. A fail safe valve actuator, comprising a bonnet adapted to be mounted on a valve body, a stem including one portion adapted to be connected to a closure member, when the bonnet is so mounted, means mounting the one stem portion within the bonnet for reciprocation in opposite directions, a rotatably mounted member threadedly connected to another portion of the stem, operating means mounted on the bonnet for manipulation from the exterior thereof, means shiftable in response to manipulation of the operating means between a first position connecting the operating means and the member for moving the other stem portion on one direction only and thus to one position in response to rotation of the operating means, and a second position rotatably disconnecting the member and operating means so that the operating means is inoperative to move the other stem portion in said one direction or resist movement of the other stem portion in the other direction, spring means for yieldably urging the stem in the other direction to move the closure member from its one position to which it may be moved under one or more controlled conditions to its other position upon failure of one of those conditions, and means automatically responsive to a control signal for shifting said connecting and disconnecting means for the first to its second position so that the operating means is inoperative to move the closure member to its one position upon reestablishment of said one controlled condition.

32. An actuator of the character defined in claim 31, wherein one of the member and the other portion is a ball nut, and a means is movable into engagement with the member to prevent rotation thereof in direction to move the other stem portion in the other direction, upon shifting of the connecting and disconnecting means into rotative engagement with the member, and out of engagement therewith to permit such rotation, upon shifting of the connecting and disconnecting means out of rotative connection with the member.

33. An actuator of the character defined in claim 31, wherein the operating means has a shaft which is mounted within the bonnet for rotation and reciprocation between inner and outer positions, and said shaft has means theron for rotative engagement with the member upon movement of the operating means into one of said inner and outer positions.

34. A fail safe valve actuator, comprising a bonnet adapted to be mounted on a valve body, a stem including one portion adapted to be connected to a closure member of the valve when the bonnet is so mounted, means mounting the one stem portion within the bonnet for reciprocation in opposite directions to move the closure member between said positions, a member threadedly connected to another portion of the stem, piston means responsive to the supply of control fluid thereto for urging the other stem portion in one direction in order to move the closure member to one position and maintain it in that position as long as the control fluid is maintained at a predetermined pressure level, spring means for yieldably urging the stem in the other direction in order to move the closure member to its other position in the event the control fluid is not so maintained, operating means mounted on the bonnet for moving the other stem portion in the one direction upon manipulation from the exterior thereof, means shiftable between a first position rotatably connecting the operating means and member for moving the other stem portion in said one direction only, in response to manipulation of the operating means to rotate the nut, and a second position rotatably disconnecting the member and operating means, and additional piston means automatically responsive to the supply of said control fluid to said first-mentioned piston means for shifting said connecting and disconnecting means to its second position. so that the operating means is inoperative to move the other stem portion in said one direction, upon reestablishment of the control fluid, or resist movement thereof in said opposite direction.

35. An actuator of the character defined in claim 34, wherein the piston means includes a plurality of cylinders arranged about the other stem portion, and a piston sealably slidable within each cylinder.

36. An actuator of the character defined in claim 35, wherein the operating means has a shaft mounted within the bonnet for rotation and reciprocation between inner and outer positions, the connecting and disconnecting means comprises means carried on the shaft for rotative engagement with the other stem portion upon movement of the shaft to its inner position, and the additional piston means is mounted within the bonnet for extension with respect to the bonnet, in response to the supply of said control fluid, to move the operating means to its outer position.

37. An actuator of the character defined in claim 34, wherein the piston means includes a cylinder in the bonnet and a piston on the one stem portion and sealably slidable in the cylinder.

38. An actuator of the character defined in claim 37, wherein the operating means has a shaft mounted within the bonnet for rotation and reciprocation therein between inner and outer positions, the connecting and disconnecting means comprises means carried on the shaft for rotative engagement with the other stem portion upon movement of the shaft into its inner position, and said additional piston means is on the shaft.

39. A fail safe valve, comprising a body having a flowway therethrough and a closure member movable therein between positions opening and closing the flowway, an actuator having a stem including one portion connected to the closure member and mounted for reciprocation in opposite directions to move the closure member between said positions, spring means for yieldably urging the one stem portion in a direction to move the closure member from one position in which it may be maintained under one or more controlled conditions to its other position upon failure of one such condition, operating means mounted on the actuator and manipulatable from the exterior thereof for moving another portion of the stem in the opposite direction in order to move the closure member to its one position, and means automatically responsive to the failure of a predetermined environmental temperature condition for rendering said operating means inoperative to move said other stem portion in said one direction upon reestablishment of said one controlled condition.

40. A fail safe valve of the character defined in claim 39, wherein the controlled conditions include a predetermined fluid pressure condition, and said means for rendering the operating means inoperative is also automatically responsive to reestablishment of said fluid pressure condition.

41. A fail safe valve, comprising a body having a flowway therethrough, and a closure member movable within the flowway to open and close the valve, an actuator mounted on the body having a stem including one portion connected to the closure member, drive means connected to another portion of the stem, operating means mounted on the actuator for manipulation from the exterior thereof, means shiftable between a first position connecting the operating means and drive means to permit the closure member to be moved to one of its position, upon manipulation of said operating means, and a second position disconnecting the operating means and drive means, so that the operating means is inoperable to so move the closure member, a part reciprocable within the actuator between a first position permitting the connecting and disconnecting means to be shifted to its first position and a second position to engage and move the shiftable means to its second position, spring means yieldably urging said shiftable means toward its second position, and means mounted on the actuator for retaining said part in its first position, but being fusible in response to a predetermined environmental temperature condition to release said part for movement to its second position.

42. A fail safe valve having a flowway therethrough and a closure member movable within the flowway to open and close the valve, a reciprocable stem including one portion connected to the closure member, drive means connected to another portion of the stem in order to move the other stem portion in one direction, and thus move the closure member to one of its positions in which it may be maintained under one more controlled conditions, in response to movement of the drive means in one direction, spring means urging the other stem portion in the opposite direction to move the closure member to its other position upon loss of a controlled condition, operating means mounted on the valve for manipulation from the exterior thereof, and means shiftable in response to a control signal between a first position connecting the operating means and the drive means to permit the operating means to be manipulated in order to move the drive means in only said one direction, and a second position disconnecting the operating means and the drive means so that the operating means is inoperable to move the drive means in said one direction upon reestablishment of said controlled condition or resist movement of the drive means in the opposite direction, the connection of said drive means to the other stem portion being operable to permit the spring means to move said one stem portion in said other direction and thus move said closure member to its other position when said shiftable means is in said second position.

43. A valve of the character defined in claim 42, wherein the control signal is the failure of a controlled condition.

44. A valve of the character defined in claim 43, wherein the controlled condition is a predetermined fluid pressure level condition.

45. A valve of the character defined in claim 43, wherein controlled condition is a predetermined environmental temperature condition.

46. A valve of the character defined in claim 44, wherein the controlled condition is alternatively a predetermined environmental temperature condition.

47. A valve of the character defined in claim 42, wherein the control signal is the reestablishment of a controlled condition.

48. A valve of the character defined in claim 47, wherein the controlled condition is a predetermined fluid pressure level condition.

49. A valve of the character defined in claim 47, wherein the control signal is alternatively the failure of another controlled condition.

50. A valve of the character defined in claim 49, wherein the other controlled condition is a predetermined environmental temperature condition.

51. A valve of the character defined in claim 42, wherein the drive means is rotatable without reciprocation, and one portion of the stem is reciprocable without rotation.

52. A valve of the character defined in claim 51, wherein one of said drive means and one stem portion is a ball nut.

53. A valve of the character defined in claim 52, wherein the operating means has a shaft thereon which is reciprocable between inner and outer positions, and the shiftable means is on the shaft for rotatable connection to the drive means in one of its positions.

54. A valve of the character defined in claim 53, including means for releasably holding the shaft in the other position.

55. A valve of the character defined in claim 51, including piston means connected to the other portion of the stem, said one stem portion being held against rotation and being connected to the other stem portion for reciprocation without rotation with respect thereon, and means by which control fluid may be supplied to the piston means to move said other stem portion in said one direction.

56. A valve of the character defined in claim 55, wherein said shiftable means comprises additional piston means to which control fluid may be supplied to move it to its second position.

57. A vlave of the character defined in claim 56, wherein said operating means has a shaft which is reciprocable between inner and outer positions, the additional piston means is on the shaft for moving it to the second position in response to the supply of control fluid.

58. A fail safe valve actuator, including a bonnet adapted to be mounted on a valve body and having a stem including one portion adapted to be connected to a closure member, drive means connected to another portion of the stem, operating means mounted on the bonnet for manipulation from the exterior thereof, means shiftable between a first position connecting the operating means and drive means to permit the closure member to be moved to one of its positions, upon manipulation of said operating means in which it may be maintained under one or more controlled conditions, and a second position disconnecting the operating means and drive means, so that the operating means is inoperable to so move the closure member, and a part reciprocable within the actuator between a first position permitting the connecting and disconnecting means to be shifted to its first position and a second position to engage and move the connecting and disconnecting means to its second position, spring means yieldably urging said connecting and disconnecting means toward its second position, and means mounted on the actuator for retaining said part in its first position but being fusible in response to a predetermined environmental temperature condition to release said part for movement to its second position.

59. A fail safe valve actuator, including a bonnet adapted to be mounted on a valve body and having a stem including one portion reciprocable in the bonnet for moving a closure member of the valve between opened and closed positions in which it may be maintained under one or more controlled conditions, drive means connected to another portion of the stem in order to move the other stem portion in one direction, and thus move the closure member to one of its positions, in response to movement of the drive means in one direction, spring means urging the one stem portion in the opposite direction to move the closure member to its other position upon loss of a controlled condition, operating means mounted on the bonnet for manipulation from the exterior thereof, and means shiftable in response to a control signal between a first position connecting the operating means and the drive means to permit the operating means to be manipulated in order to move the drive means in only said one direction, and a second position disconnecting the operating means and the drive means so that the operating means is inoperable to move the drive means in said one direction upon reestablishment of said controlled condition, or resist movement of the drive means in the opposite direction, the connection of said drive means to the other stem portion being operable to permit the spring means to move the other stem portion in the opposite direction and thereby move said closure member to its other position when said shiftable means is in said second position.

60. An actuator of the character defined in claim 59, wherein the control signal is the failure of a controlled condition.

61. An actuator of the character defined in claim 60, wherein the controlled condition is a predetermined fluid pressure level condition.

62. An actuator of the character defined in claim 60, wherein the controlled condition is a predetermined environmental temperature condition.

63. An actuator of the character defined in claim 61, wherein the controlled condition is alternatively a predetermined environmental temperature condition.

64. An actuator of the character defined in claim 59, wherein the control signal is the reestablishment of a controlled condition.

65. An actuator of the character defined in claim 64, wherein the controlled condition is a predetermined fluid pressure level condition.

66. An actuator of the character defined in claim 64, wherein the control signal is alternatively the failure of another controlled condition.

67. An actuator of the character defined in claim 60, wherein the other controlled condition is a predetermined environmental temperature condition.

68. A valve of the character defined in claim 59, wherein the drive means is rotatable without reciprocation, and one portion of the stem is reciprocable without rotation.

69. A valve of the character defined in claim 68, wherein one of said drive means and one stem portion is a ball nut.

70. A valve of the character defined in claim 69, wherein the operating means has a shaft thereon which is reciprocable between inner and outer positions, and the shiftable means is on the shaft for rotatable connection to the drive means in one of its positions.

71. A valve of the character defined in claim 70, including means for releasably holding the shaft in the other position.

72. A valve of the character defined in claim 68, including piston means connected to the other portion of the stem, said one stem portion being held against rotation and being connected to the other stem portion for reciprocation without rotation with respect thereon, and means by which control fluid may be supplied to the piston means to move said other stem portion in said one direction.

73. A valve of the character defined in claim 72, wherein said shiftable means comprises additional piston means to which control fluid may be supplied to move it to its second position.

74. A valve of the character defined in claim 73, wherein said operating means has a shaft which is reciprocable between inner and outer positions, the additional piston means is on the shaft for moving it to the second position in response to the supply of control fluid.

75. A fail safe valve, comprising a valve body having a flowway therethrough, a closure member movable within the valve body between positions opening and closing the flowway, a generally cylindrical housing on the valve body, a stem on the closure member extending from the body and into the housing for longitudinal reciprocation therein, a flange on the stem, a plurality of cylinders mounted on the outer end of the housing each to one side of the stem axis, a piston sealably reciprocable with respect to each cylinder and extending into the housing for engaging the stem flange in order to move the closure member to one position in response to the supply of operating fluid to the cylinders, and spring means within the housing and compressed between the stem and housing to move the closure member to its other position upon the exhaust of operating fluid from the cylinder, the outer ends of the pistons being generally adjacent the outer ends of the cylinders in said other position of the closure member.

76. A valve of the character defined in claim 75, wherein the housing has an inner end wall through the stem sealably extends, and the cylinders extend outwardly from the outer end wall laterally to one side of the stem.

77. A valve of the character defined in claim 75, wherein the spring means surrounds the stem and is compressed between the flange and inner end of the housing.

78. A fail safe valve actuator, comprising a generally cylindrical bonnet adapted to be mounted on the body of a valve, a stem adapted to be connected to a closure member mounted in the valve body for movement between positions opening and closing a flowway through the body, means mounting the stem within the bonnet for longitudinal reciprocation therein opposite directions in order to move the closure member between said positions, a flange on the stem, a plurality of cylinders mounted on the outer end of the bonnet each to one side of the stem axis, a piston sealably reciprocable with respect to each cylinder and extending into the housing for engaging the stem flange in order to move the closure member to one position in response to the supply of operating fluid to the cylinders, and spring means within the bonnet and compressed between the stem and the bonnet to move the closure member to its other position upon the exhaust of operating fluid from the cylinder, the outer ends of the pistons being generally adjacent the outer ends of the cylinders in said other position of the closure member.

79. An actuator of the character defined in claim 78, wherein the bonnet has an end wall through which the stem is sealably extendable, and the cylinders extend outwardly from the outer end wall laterally to one side of the stem.

80. An actuator of the character defined in claim 78, wherein the spring means surrounds the stem and is compressed between the flange and the inner end of the housing.

* * * * *